United States Patent [19]

Keefe et al.

[11] Patent Number: 4,528,457
[45] Date of Patent: Jul. 9, 1985

[54] DC-AC CONVERTER FOR SUPPLEMENTING AN AC POWER SOURCE

[76] Inventors: Donald J. Keefe, 1531 Portesuello Ave., Santa Barbara, Calif. 93105; Oscar D. Despe, R.R. 4, Box 290, Lockport, Ill. 60441

[21] Appl. No.: 470,152

[22] Filed: Feb. 28, 1983

[51] Int. Cl.³ .............................................. H02J 3/44
[52] U.S. Cl. ...................................... 307/46; 307/66; 307/87; 363/132
[58] Field of Search ....................... 307/45, 46, 64, 66, 307/87; 363/132

[56] References Cited

U.S. PATENT DOCUMENTS

| | | | |
|---|---|---|---|
| 3,435,316 | 3/1969 | Wilkerson | 422/173 |
| 3,895,236 | 7/1975 | Herron | 290/55 |
| 3,946,242 | 3/1976 | Wilkerson | 307/45 |
| 3,991,319 | 11/1976 | Seruos et al. | 307/64 |
| 4,180,745 | 12/1979 | Bartlett et al. | 307/45 |
| 4,327,295 | 4/1982 | Deane | 307/48 X |
| 4,366,388 | 12/1982 | Wilkerson | 307/46 |
| 4,442,483 | 4/1984 | Baumann et al. | 363/132 X |

FOREIGN PATENT DOCUMENTS 888333 12/1981 U.S.S.R. ............................. 363/132

Primary Examiner—A. D. Pellinen
Assistant Examiner—Derek S. Jennings
Attorney, Agent, or Firm—Neuman, Williams, Anderson & Olson

[57] ABSTRACT

A DC-AC converter for supplying power from a DC power source to a load that is also supplied power by an AC power source. The DC power source is applied to the load with alternating polarity at the frequency and phase of the AC power source. Transients are reduced by limiting the application of the DC power source to the load to less than the duration of each half cycle of the AC power source.

9 Claims, 20 Drawing Figures

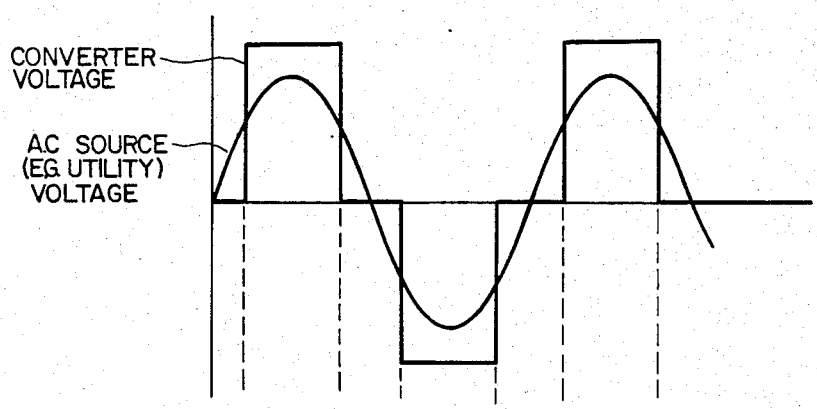
FIG. 6a
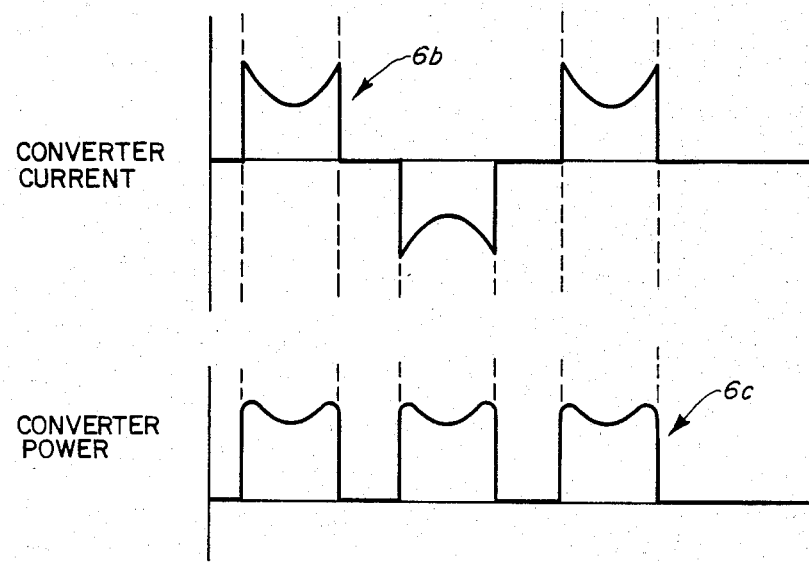
FIG. 6b
FIG. 6c
FIG. 6d  FIG. 6e
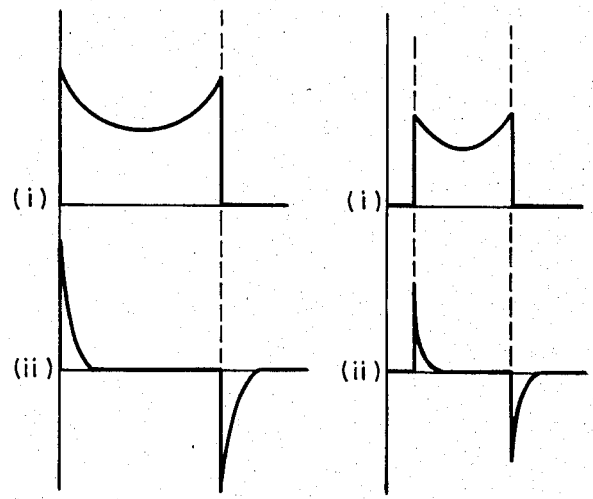

DC-AC CONVERTER FOR SUPPLEMENTING AN AC POWER SOURCE

BACKGROUND OF THE INVENTION

In recent years, society has become increasingly aware of the finite nature of the earth's natural resources, particularly the fossil fuels, coal, crude petroleum and natural gas. As these energy sources become continually more scarce, the cost of recovering them increases, and the price a consumer must pay for energy likewise increases. Consequently, consumers and industry alike are now looking at the more abundant and potentially less expensive alternative energy sources, such as wind, sunlight and geothermal energy production, to supply their energy needs.

Typically, the energy tapped from these alternative energy sources is used in the form of electricity, e.g., a solar array acting as a DC power source and a windmill providing AC power through a generator means. On the scale of an individual household, this electric power may be used to supply electrical appliances or stored in batteries for later use. However, to power even small household electrical appliances, the electric power supplied by alternative energy sources is often too intermittent and unpredictable in magnitude to use as the sole power source, primarily owing to the small scale of energy collecting devices employed and the fickle nature of local climatic conditions. Supplemental power may be obtained from storage batteries, but again the amount of power that is available from the batteries is uncertain. Consequently, alternative energy sources of the type mentioned above are usually employed as supplementary sources of energy, aiding the local electric utility in supplying power to a given load. This is particularly true where a constant and uniform supply of electricity is required by the load. Such a supplemental source of energy may be used independently of the electric utility by connecting the supplemental source alone to selected loads only when supplemental energy is available. Alternatively, the supplemental energy source may be adapted to supply power directly to the utility's power grid.

To supplement the power supplied by an electric utility, however, the voltage signal supplied by an alternative energy source must be converted to an AC signal having the frequency of the AC voltage signal supplied by the utility, e.g., 60 Hz. in the United States. This is done by first converting the raw voltage signal supplied by the alternative energy source to DC, if it was originally AC, and then using a DC-AC power converter to transform the DC signal into a usable AC voltage signal of the proper frequency. The need for this latter frequency conversion arises because of the construction of the appliances being supplied, which are often designed to operate most efficiently at the frequency of the AC voltage signal supplied by the utility grid.

SUMMARY OF THE INVENTION

It is the general object of the present invention to provide an improved DC-AC converter which supplements an AC power source supplying power to a load.

Another object of the present invention is to minimize disruptive current transients during its operation.

An additional object of the present invention is to provide an electronically controlled DC-AC converter with minimum control restraints so as to provide an efficient means of power conversion for supplementing an AC power source.

It is a further object of the present invention to sense and automatically track the frequency of the AC power source.

Another object of the present invention is to supply power in excess of that required by the load to the AC source or other loads being supplied by the AC source.

Still another object of the present invention is to provide a DC-AC converter for supplementing the AC power source, which converter is of simple and economical design.

Further objects, features and advantages will become apparent from consideration of the following summary of the invention, the description and operation of the invention and the accompanying drawings.

The present invention relates generally to DC-AC power converters, and more specifically to a DC-AC power converter adapted for supplementing an AC power source such as an electric utility. The general environment in which the invention operates includes a DC power source, the AC power source, and a load that is being supplied by the AC source. Comprising a synchronizing means and a switching means, the converter of the present invention transforms the voltage output of the DC power source into a DC voltage signal of alternating polarity having the frequency of the AC power source and applies the transformed voltage signal to the load. The switching means interfaces the DC power source and the load and is controllable to apply the DC source to the load in either the positive or negative polarity. The synchronizing means operates the switching means to apply the DC source to the load with alternating polarity at the sensed frequency, thereby supplementing the power supplied to the load by the AC power source. However, during each half cycle of the AC power source, the DC source is applied to the load for a time less than the duration of the half cycle in order to minimize transient signals that may arise during the switching operation.

To effect efficient and safe conversion of the energy supplied by the DC source, the preferred embodiment is further characterized by the following parameters:

(a) The impedance of the AC source must be significantly lower than that of the power converter. This ensures that the voltage waveform of the AC source remains substantially unaltered when power is supplied to the load by the power converter.

(b) The power converter may operate only during the presence of the AC power source.

(c) The power converter is a net source of power to the power grid supported by the AC source if the voltage output of the power converter is greater in magnitude than the instantaneous magnitude of the voltage waveform supplied by the AC source.

BRIEF DESCRIPTION OF THE DRAWINGS

For a more complete understanding of the invention, reference will now be made by way of example to the accompanying drawings in which:

FIGS. 6a–6e are waveform diagrams illustrating output of the present invention.

DETAILED DESCRIPTION OF THE PREFERRED EMBODIMENT

Figure 1:
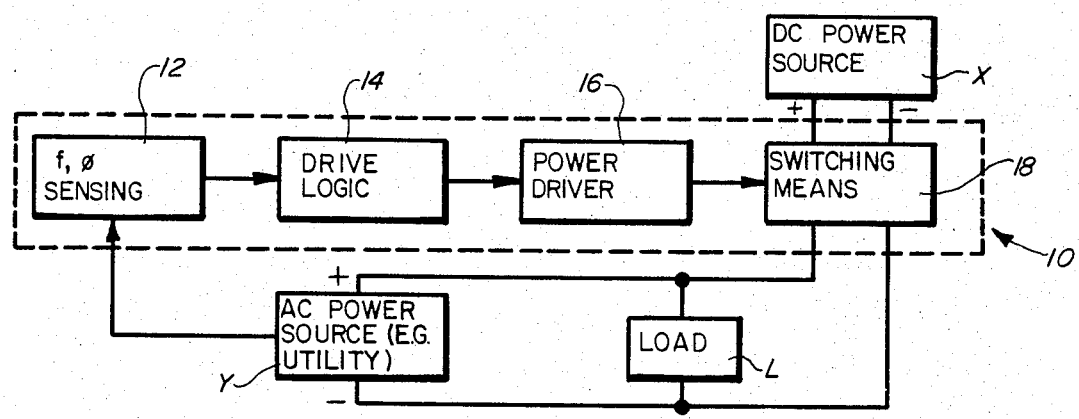
FIG. 1 is a block diagram of the present invention.

Referring now to the drawings in general and FIG. 1 in particular, a DC-AC converter 10 for supplementing an AC power source such as an electric utility is shown in accordance with the present invention. The DC-AC converter 10 is adapted to supply power from a DC power source X to a load L that is also supplied power by the AC power source Y. DC source X need not produce a precisely constant voltage signal, however; rather, a fluctuating DC supply, such as the DC power obtained by rectification of an AC power source that meets prescribed magnitude limits, may also be used in conjunction with the present invention.

Converter 10 is connected to the load in parallel with the AC power source Y so that power supplied by the converter which exceeds the power demanded by the load being directly serviced is supplied to the AC power source or other loads supplied by the AC power source. During operation of converter 10, the frequency and phase of AC power source Y is sensed by converter 10 in sensing means 12. On the strength of this sensed signal, drive logic circuit 14 derives control signals which operate power driver circuit 16 which, in turn, controls switching means 18. Various accessory DC power supplies are needed to power the drive logic circuit and the power driver circuit and are not detailed in the accompanying drawings. It is to be understood that the accessory DC power supplies may be any suitable power supplies well known in the art.

Switching means 18 is operatively connected between DC power source X and the load L, and is controlled so as to apply the DC source to the load with alternating positive and negative polarity at the frequency of AC power source Y. In the present invention, DC power source X is applied to load L during each half cycle of AC power source Y for a time slightly shorter than the duration of such half cycle, and the resulting narrowed DC pulse is substantially temporally centered within the half cycle. As a result, the current transients which occur at the leading and trailing edges of the DC pulse are minimized.

Figure 2:
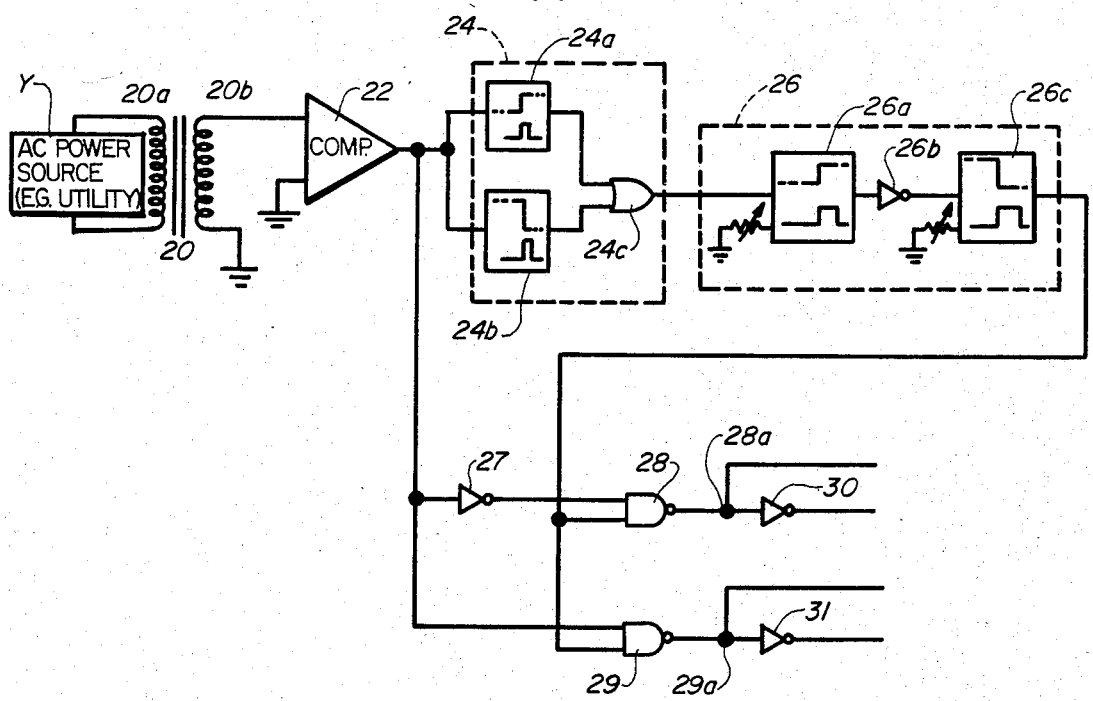
FIG. 2 is a combination block and schematic diagram of the frequency sensing means and the drive logic circuit of the preferred embodiment of the present invention.

Sensing means 12 and drive logic circuit 14 are shown in more detail in FIG. 2. The sensing means comprises step-down transformer 20, the primary winding 20a of which is connected across the terminals of AC power source Y. At the secondary winding 20b is generated a low voltage signal proportional to the voltage signal supplied by AC power source Y and, in particular, having the same frequency and phase of such AC voltage signal. The turns ratio of transformer 20 is chosen to reduce the magnitude of the voltage of the AC voltage signal to a value acceptable to the logic circuitry of drive logic circuit 14.

Drive logic circuit 14 comprises comparator 22, pulse shaper 24, delay circuit 26, NAND gates 28 and 29, and inverter gates 27, 30 and 31. Comparator 22 is connected to the secondary winding 20b of transformer 20 and generates a waveform that is low (approximately 0 volts) when the input to the comparator is of zero or negative voltage and high (approximately 5 volts) when the input to the comparator is of positive voltage. The output of comparator 22 is connected to the input of pulse shaper circuit 24, the input of inverter gate 27 and one input of NAND gate 29. The output of inverter gate 27 is connected to one input of NAND gate 28. Pulse shaper 24 may consist of monostable multivibrators 24a and 24b, multivibrator 24a being triggered on the leading edge of a pulse input to pulse shaper 24 and multivibrator 24b being triggered on the falling edge of the pulse input. The outputs of these two multivibrators are input to an OR gate 24c which forms the output waveform of pulse shaper 24.

Delay circuit 26 is connected to the output of pulse shaper 24 and may comprise, in series, a first adjustable monostable multivibrator 26a, an inverter gate 26b, and a second adjustable monostable multivibrator 26c. The first monostable generates a pulse of predetermined duration upon being triggered by the leading edge of a pulse that is received at its input. Receiving as its input the inverted output of the first monostable multivibrator, the second monostable multivibrator generates a pulse of predetermined duration upon triggering by the leading edge of each pulse of its input waveform. The output of delay circuit 26 is then connected to the second inputs of NAND gates 28 and 29. The outputs of NAND gates 28 and 29 are connected to inverter gates 30 and 31 through nodes 28a and 29a, respectively. This circuitry produces four synchronized digital pulses and enables precise control of both the pulse width and its temporal position within each alternation of the AC source voltage cycle.

Figure 3A:
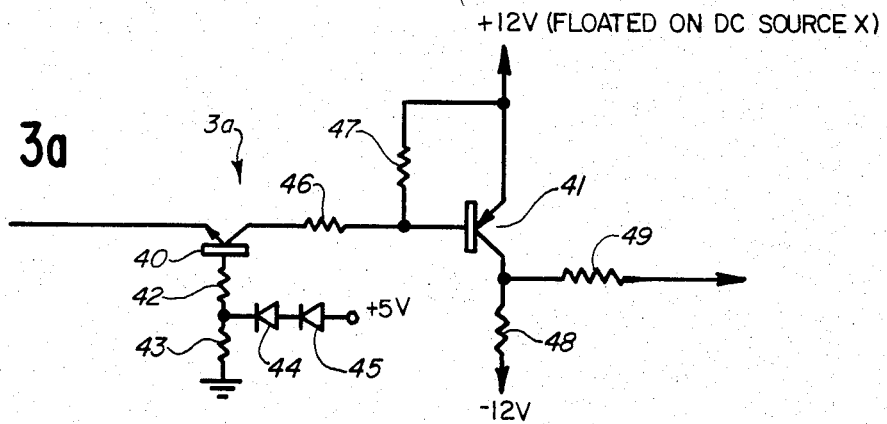
FIGS. 3a, 3b are schematic diagrams of power driver circuits that may be used in the preferred embodiment.
Figure 3B:
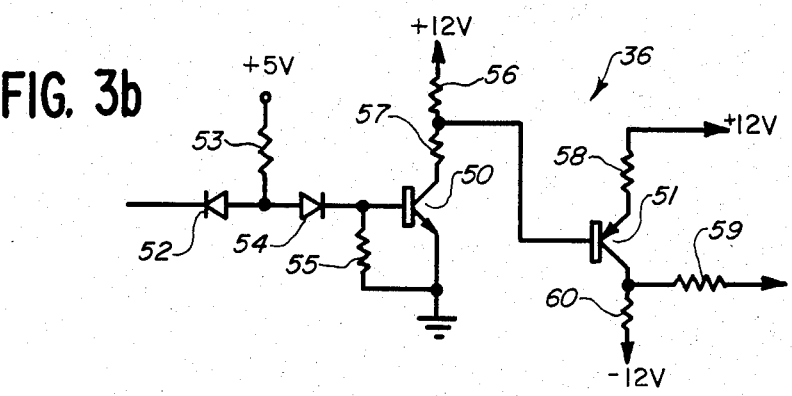

Power driver circuit 16 consists of four drive circuits arranged in two pairs, each pair including one drive circuit as shown in FIG. 3a and one drive circuit as shown in FIG. 3b. The output of each of inverter gates 30 and 31 is connected to the input of a drive circuit 3a shown in FIG. 3a, and the output of each of NAND gates 28 and 29, taken at nodes 28a and 29a, is connected to the input of a drive circuit 3b shown in FIG. 3b. In drive circuit 3a, the emitter of npn transistor 40 is connected to the input of the drive circuit and the collector of transistor 40 is connected to the base of pnp transistor 41 through resistor 46. The base of transistor 40 is connected to ground through resistors 42 and 43, the interconnection of which resistors is connected to a 5 volt power supply through diodes 44 and 45. Resistor 47 connects the base of transistor 41 to its emitter, which is tied to a 12 volt power supply floated on the positive terminal of the DC power source X. The collector of transistor 41 is connected to a −12 volt power supply through resistor 48 and to the output of the drive circuit through resistor 49. During operation of drive circuit 3a, when the emitter of transistor 40 is held low, transistor 40 is turned on. This causes current to flow from the floating 12 volt power supply through resistors 47 and 46, thereby turning on transistor 41. When transistor 41 turns on, the output voltage of drive circuit 3a is approximately that of the floating 12 volt power supply minus the voltage drop across resistor 49. Conversely, when the emitter of transistor 40 is held high, transistors 40 and 41 are nonconducting and the output of drive circuit 3a is approximately −12 volts.

The input of drive circuit 3b is connected to a −5 volt power supply through resistor 53 and diode 52, the interconnection of which latter components is connected to the base of npn transistor 50 through diode 54.

The base of transistor 50 is connected to ground, and also to the emitter of transistor 50 through resistor 55. The collector of transistor 50 is connected to a 12 volt power supply through resistors 56 and 57, and the interconnection of these resistors is connected to the base of pnp transistor 51. The emitter of transistor 51 is connected to a 12 volt power supply through resistor 58. The collector of transistor 51 is tied to a −12 volt supply through resistor 60 and connected to the output of drive circuit 3b through resistor 59. During operation of drive circuit 3b, when the input of the drive circuit is held high, transistors 50 and 51 are turned on, and the voltage at the output of the drive circuit is substantially 12 volts minus the voltage drops across resistors 58 and 59. When the input to drive circuit 3b is low, however, transistors 50 and 51 are turned off and the voltage at the output of the drive circuit is approximately −12 volts.

Figure 4A:
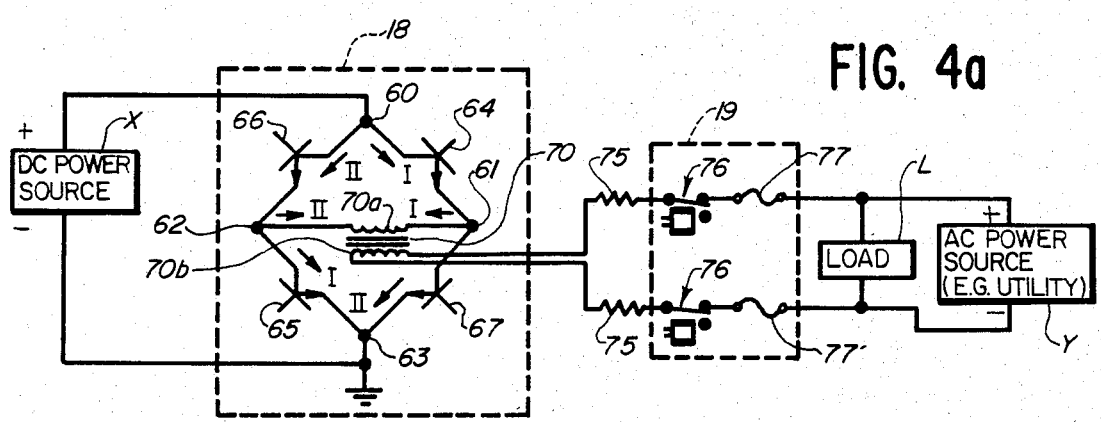
FIGS. 4a, 4b are diagrams of the switching means and the output circuit of the preferred embodiment.

The switching means 18 is shown in detail in FIG. 4a, along with optional output circuit 19. In the preferred embodiment, switching means 18 comprises a switching transistor bridge including switching transistors 64 through 67. The bases of transistors 64 through 67 are connected to the outputs of inverter gate 31, NAND gate 29 (at node 29a), inverter gate 30, and NAND gate 28 (at node 28a), respectively, through the drive circuits as indicated above. Node 60 of the transistor bridge is connected to the positive terminal of DC power source X. Node 63 is connected to the negative terminal of the DC power source X and to ground. The switching transistors are arranged in the bridge so that when only transistors 64 and 65 are turned on, current from DC power source X flows in the direction of the arrow marked I through node 60, transistor 64, node 61, primary winding 70a of step-up transformer 70, node 62, transistor 65, node 63, and to the grounded negative terminal of DC power source X. When only transistors 66 and 67 are turned on, current from the DC power source X flows in the direction of the arrow marked II through node 60, transistor 66, node 62, primary winding 70a of transformer 70, node 61, transistor 67, node 63 and to the grounded negative terminal of the DC power source X. The secondary winding 70b of transformer 70 may be connected to the terminals of load L directly or, as is shown, through protective output circuitry 19. Resistors 75 together with the impedance of secondary winding 70b of transformer 70 represent the output impedance of the converter. The values of these latter components are preferably chosen so that the output impedance of converter 10 is much larger than the impedance of AC power source Y, which is typically very small where the AC source Y is an electric utility, yet much smaller than the impedance of the load L. Satisfying the first condition ensures that the voltage signal supplied by AC power source Y is not altered by the existence of converter 10 "on line". Satisfying the second condition helps to minimize the loss of converter efficiency due to power loss within the converter itself.

Figure 4B:
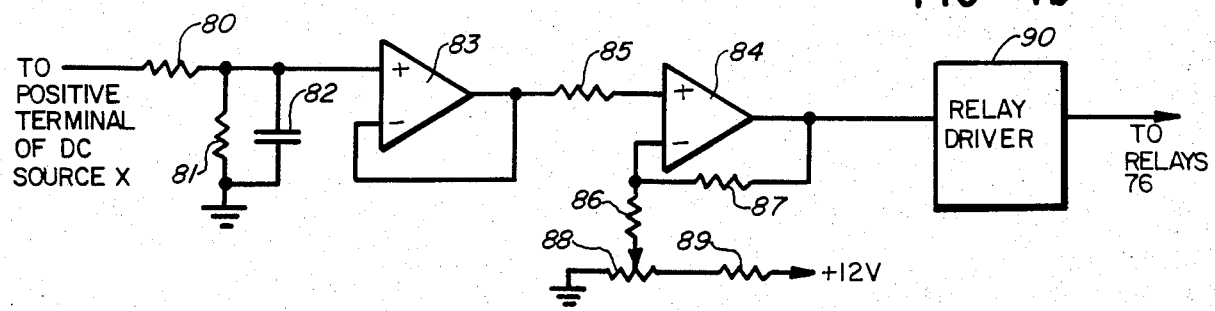
Figure 5A:
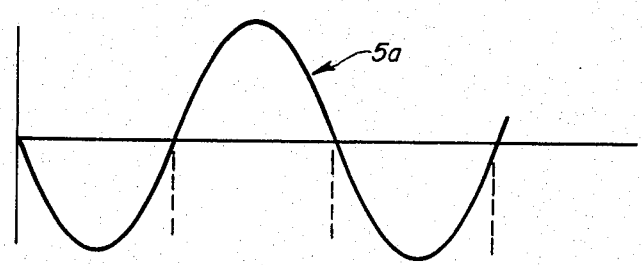
FIGS. 5a–5i are waveform diagrams illustrating the output signal of an AC power source and various signals generated by the drive logic circuit of the present invention.
Figure 5B:
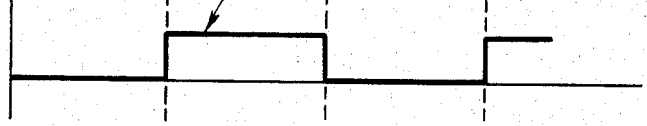
Figure 5C:
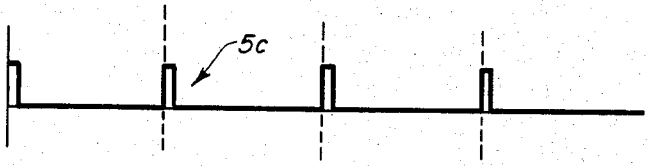
Figure 5D:
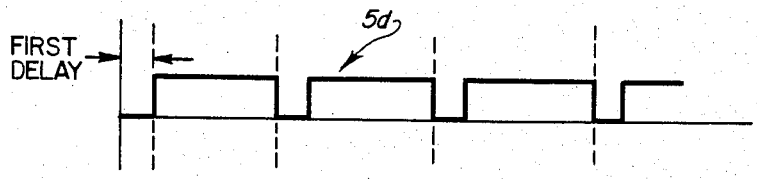
Figure 5E:
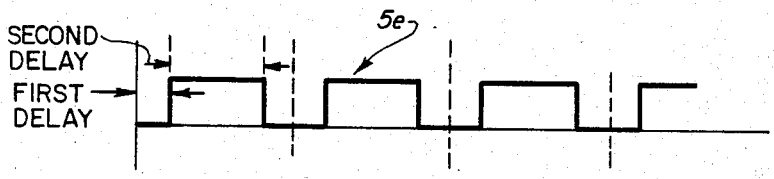
Figure 5F:
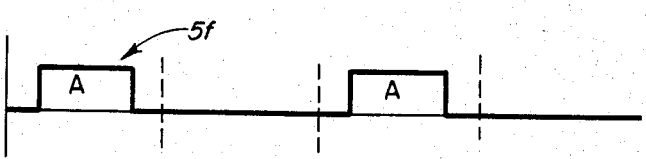
Figure 5G:
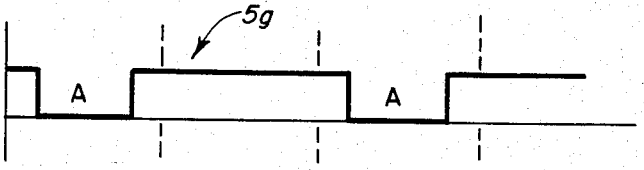
Figure 5H:
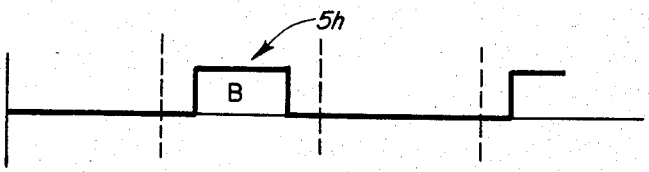
Figure 5I:
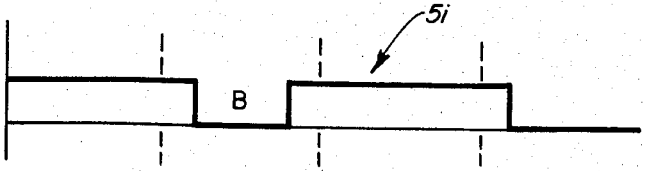

Output circuit 19 comprises relays 76 and circuit breakers 77. Circuit breakers 77 will open if their current ratings are exceeded, thereby disconnecting the converter from load L and AC source Y. This situation might occur in the event of a converter malfunction or a short circuit in the load or the transmission lines. Relays 76 are controlled by the circuit shown in FIG. 4b and described hereafter. The purpose of relays 76 and their associated drive circuitry is to connect the converter 10 to the load L and AC source Y when the magnitude of the voltage signal supplied by DC source X is above a predetermined value. The positive terminal of the DC power source X is connected to resistor 80 which, together with resistor 81 and capacitor 82, form a filter network that serves two purposes. First, the filter network smoothes out any ripple in the voltage signal supplied by the DC source, which ripple may exist, for example, if the DC source is actually a rectified AC power source. Second, the network scales down the magnitude of the DC voltage signal to a value manageable by the following circuitry. The output of this filter network is connected to the positive input of operational amplifier 83, the negative input of which is tied to the amplifier's output. So configured, operational amplifier 83 acts as a buffer to electrically isolate the following circuitry from the filter network previously described. The output of operational amplifier 83 is connected to the positive input of operational amplifier 84 through resistor 85. The negative input of operational amplifier 84 is connected to the amplifier's output through resistor 87 and also to the third terminal of variable resistor 88 through resistor 86. A first terminal of variable resistor 88 is connected to a 12 volt power supply through resistor 89, and a second terminal of resistor 88 is connected to ground. The output of operational amplifier 84 drives a common relay driver 90 which, in turn, closes relays 76. The voltage signal received at the positive input of operational amplifier 84 is proportional to the average voltage signal supplied by DC power source X. The voltage signal received at the negative input of operational amplifier 84 is controllable by adjustment of variable resistor 88 and is set to a predetermined value which causes the output of amplifier 84 to assume its most positive value only when the average output level of converter 10 exceeds the peak voltage magnitude of the AC power source Y by a preselected amount. Under this condition, the relay driver 90 closes relays 76 to connect converter 10 to the load L and the AC source Y.

OPERATION OF THE PREFERRED EMBODIMENT

The operation of the above-described converter will now be explained by reference to the various waveform diagrams shown in FIGS. 5a–i and 6a–e. Waveform 5a represents the voltage signal generated by the AC power source Y which is supplying power to load L. As mentioned, the AC source Y may be an electric utility whose power may be tapped by an individual household at the electrical outlet. In the sensing means 12 of the DC-AC converter 10, the voltage signal of the AC source Y is applied to primary winding 20a of step-down transformer 20. The output waveform generated by the secondary winding 20b exhibits the same frequency and phase as the sinusoidal input to the transformer, but is scaled down to a voltage range acceptable to drive logic circuit 14. For the purpose of this disclosure, waveform 5a may also be taken to represent the output voltage waveform of sensing means 12.

In drive logic circuit 14, this output waveform of sensing means 12 is first passed through comparator 22, generating voltage waveform 5b. This waveform comprises a train of positive pulses each having the duration of approximately a half cycle of waveform 5a. The phase and frequency of square waveform 5b is the same as that of waveform 5a. To ensure prompt detection by comparator 22 of the low voltage leading and trailing edges of a positive half cycle of waveform 5a, the latter may be amplified and clipped—as is well known in the art—before being input to comparator 22. Pulse shaper 24 receives square waveform 5b and generates waveform 5a, comprising a train of pulses of short duration, a pulse being triggered at the occurrence of each leading and trailing edge of waveform 5b. The duration of the pulses in waveform 5c is set to be less than the duration of the pulses of waveform 5b. It can be seen that the leading edges of the pulses of waveform 5c correspond to the zero-crossings of sinusoidal waveform 5a. Receiving as its input waveform 5c, delay circuit 26 generates waveform 5e, which is also the output of adjustable monostable multivibrator 26a. Waveform 5d is an intermediate waveform generated within delay circuit 26 by adjustable monostable multivibrator 26a. The delay caused by multivibrator 26a is indicated in waveform 5d and can be seen in waveform 5e. The delay caused by multivibrator 26c is indicated in waveform 5e and determines the pulse duration in that waveform. By varying the duration of the first and second delays, the pulse width in waveform 5e and its temporal position between the zero-crossings of waveform 5a can be predetermined as desired.

The logic gates remaining in drive logic circuit 14, and shown in FIG. 2, form from waveforms 5b and 5e the control waveforms 5f, 5g, 5h and 5i, which appear as the outputs of NAND gate 28, inverter gate 30, NAND gate 29 and inverter gate 31, respectively. As explained in the DETAILED DESCRIPTION above, the output of NAND gate 28 at node 28a is connected to the base of switching transistor 67 of switching means 18 through a drive circuit 3b; the output of inverter gate 30 is connected to the base of switching transistor 66 through a drive circuit 3a; the output of NAND gate 29 at node 29a is connected to the base of switching transistor 65 through a drive circuit 3b; and the output of inverter gate 31 is connected to the base of switching transistor 64 through a drive circuit 3a. The purpose of connecting the emitter of transistor 41 of drive circuit 3a to a 12 volt power supply floated on the positive terminal of DC power source X can now be seen. Switching transistors 64 and 66 are located at the high voltage side of the transistor bridge of switching means 18. To saturate these two transistors and ensure their proper switching operation, the turn-on voltage signal applied to the transistors' bases should approach the relative voltage of their collectors, which is approximately equal to the voltage of DC power source X. By tieing the emitter of transistor 41 of drive circuit 3a to the described floating 12 volt power supply, it is assured that the output of the drive circuit 3a can saturate either one of switching transistors 64 and 66, even when the voltage of DC source X is fluctuating.

During the time interval designated A in control waveforms 5f and 5g, switching transistors 67 and 66 are forced into their conducting state; at this time, switching transistors 65 and 64 are forced nonconducting owing to control waveforms 5h and 5i, respectively. In this state, which occurs during the negative half cycle of AC power source Y as represented by waveform 5a, switching means 18 applies DC power source X to load L in the negative polarity, but for a time somewhat shorter than the duration of the half cycle of the AC source. Similarly, during the positive half cycle of AC power source Y switching transistors 67 and 66 are made nonconducting owing to control waveforms 5f and 5g, respectively, while switching transistors 65 and 64 are conducting for time interval designated B owing to control waveforms 5h and 5i, respectively. In this state, switching means 18 applies the DC power source X to the load L in the positive polarity. During continued operation of the present invention, it can be seen by reference to the waveforms of FIGS. 5a–i that drive logic circuit 14 and power driver circuit 16 act as a synchronizing means to electronically synchronize the operation of switching means 18 so that the DC power source is applied to the load circuit with alternating polarity and at the frequency of AC power source Y as sensed by sensing means 12. Further, when time intervals A and B (which are of identical duration) of control waveforms 5f through 5i are chosen to have a duration less than the duration of a half cycle of AC power source Y, the DC power source X is applied to load L during a half cycle of the AC source for a correspondingly shortened duration relative to the duration of the half cycle. And by adjusting multivibrators 26a and 26c of the delay circuit 26 to alter the duration and time of commencement of time intervals A and B of the control waveforms, the duration and time of commencement of the narrowed DC voltage pulse, relative to the AC signal half cycle during which the DC pulse is applied to the load, may be predetermined. In other words, the duration of the DC voltage pulses and the phase of the train of DC pulses relative to the phase of the AC power source may be controlled in the present invention. During the periods of time between application of the DC voltage pulses to the load, the switching transistors of switching means 18 are made nonconducting by control waveforms 5f through 5i, thereby preventing current supplied by the AC power source Y from flowing back into the converter.

The power delivered by DC-AC converter 10 is now explained by reference to FIGS. 6a–6e. FIG. 6a shows the relative voltage magnitudes of the signals of the converter 10 and the AC power source Y during operation of the converter. The turns ratio of step-up transformer 70 is chosen in view of the anticipated voltage output of the DC power source X so that the voltage magnitude of the DC pulses will normally exceed that of the AC voltage signal. Step-up transformer 70 may be deleted from the bridge circuit if the unaltered voltage output of the DC power source X is sufficiently large. If the voltage magnitude of the AC signal exceeds that supplied by the DC voltage source, however, relay 76 automatically opens and disconnects the converter from the load L and the AC power source Y, thereby preventing the occurrence of a situation where the AC source would be supplying power to the converter.

The current provided by the converter should actually be thought of as being delivered to the AC power grid. This current is shown by signal 6b of FIG. 6b and is equal to the instantaneous difference in voltage magnitude between the two signals of FIG. 6a divided by the output impedance of the converter 10, here assumed to be purely resistive for convenience of illustration. Signal 6c in FIG. 6c shows the power pulses delivered to the AC grid by converter 10. The instantaneous magnitude of such a power pulse is equal to the instantaneous magnitude of the AC voltage waveform multiplied by the instantaneous magnitude of the current supplied to the AC grid by the converter. It can also be seen that the magnitude of the power pulses supplied to the AC grid by the present invention increases with an increase in the magnitude of the DC voltage source, which more than proportionately increases the magnitude of the current pulse supplied to the AC grid since this current supplied by the converter varies with the difference between the magnitudes of the DC voltage pulse and the AC voltage signal.

Power is thus actually supplied to the load L by both converter 10 and AC power source Y during the time that the voltage magnitude of the converter pulse exceeds that of the signal supplied by the AC source. If the power supplied solely by converter 10 is greater than that demanded by load L, the excess is supplied to the AC power source or other loads powered by the AC source.

The effect on current transients of temporally narrowing the DC voltage pulses applied to the load by the DC-AC converter 10 can be explained by reference to the current waveforms shown in FIGS. 6d and 6e. The waveform shown in FIG. 6d(i) is a current pulse supplied to a resistive load by a converter according to the present invention where the duration of the DC voltage pulse applied to the load is equal to the duration of a half cycle of the AC power source. The current transients developed as a result of operating the converter with this pulse duration are shown by the waveform in FIG. 6d(ii). If, however, the DC voltage pulses applied to the load are temporally narrowed relative to the duration of such half cycle, resulting in the current pulse shown by the waveform in FIG. 6e(i), the current transients developed—shown by the waveform in FIG. 6e(ii)—are reduced. The reduction in the magnitude of the current transients is due to the fact that the peak magnitude of the current pulse supplied to the load is reduced as the DC voltage pulse offered to the load is narrowed. This latter relationship in turn results from the fact that the peak magnitude of the difference between the DC voltage pulse and the instantaneous magnitude of the voltage signal supplied by the AC power source, as seen in FIG. 6a, is reduced as the DC voltage pulse is made temporally narrower than the half cycle of the AC power source. By reducing the magnitude of current transients during operation of the converter, the possibility of damage to the switching transistors of switching means 18 is reduced. Also, since these current transients act as high frequency noise to adversely affect local communications systems, suppressing the transients as accomplished by the present invention lessens the need for shielding and other protective measures.

The amount of power actually delivered to the AC grid by the present invention depends on several factors. Among these are the difference in magnitude between the DC voltage pulse and the voltage signal supplied by the AC power source; the duration of the DC voltage pulse applied to the load by the converter; the temporal position of the DC voltage pulse within a half cycle of the AC power source; and the output impedance of the converter. In an actual reduction to practice of the present invention, initial testing has shown that under optimal conditions, the converter described herein delivers power at a very favorable system efficiency of 80% or better.

While the preferred embodiment of the invention has been shown, it will be understood, of course, that the invention is not limited thereto since modifications may be made by those skilled in the art, particularly in light of the foregoing teachings. It is, therefore, contemplated by the following claims to cover any such modifications as incorporate those features which constitute the essential features within the true spirit and scope of the invention.

What is claimed is:

1. A DC-AC converter for supplying power from a DC power source to supplement a load circuit that is also supplied power by an AC power source, comprising:

switching means operatively connected between the DC power source and the load circuit and controllable to apply the DC power source to the load circuit in either polarity; and means for synchronizing the operation of the switching means so that the DC power source is applied to the load circuit with alternating polarity at the frequency of the AC power source; said synchronizing means further comprising means to sense the frequency and phase of the AC power source and circuit means operatively connected to the sensing means and the switching means to form control signals for controlling the switching means so that the DC power source is applied to the load circuit during each half cycle of the AC power source between a predetermined on-time and a predetermined off-time that are temporally positioned within the half cycle away from the zero crossings of the half cycle.

2. The DC-AC converter of claim 1 wherein the synchronizing means controls the switching means so that the DC power source is applied to the load circuit with alternating polarity at the frequency of the AC power source and at a predetermined phase shift relative to the AC power source.

3. The DC-AC converter of claim 1 wherein the synchronizing means controls the switching means so that each narrowed DC pulse applied to the load circuit during a half cycle of the AC power source is temporally substantially centered within the half cycle.

4. The DC-AC converter of claim 1 wherein the switching means comprises a two state device in which the DC power source is applied with one polarity to the load circuit when the switching means is in a first state and the DC power source is applied with the opposite polarity to the load circuit when the switching device is in a second state.

5. The DC-AC converter of claim 1 wherein the switching means is a bridge having four electronic switching devices arranged in two pairs, the DC power source being applied with positive polarity to the load circuit when each of a first pair of switching devices is rendered conductive while both of the second pair of switching devices are nonconductive, and the DC power source being applied with negative polarity to the load circuit when each of the second pair of switching devices is rendered conductive while both of the first pair of switching devices are nonconductive.

6. The DC-AC converter of claim 1 including means to disconnect the switching means from the load circuit when the magnitude of the voltage applied to the load circuit by the DC power source is less than a predetermined value.

7. The DC-AC converter of claim 6 wherein the predetermined value is approximately the magnitude of the voltage of the signal applied to the load circuit by the AC power source.

8. A DC-AC converter for supplying power from a DC power source to supplement a load circuit that is also supplied power by an AC power source, comprising:

switching means operatively connected between the DC power source and the load circuit and controllable to apply the DC power source to the load circuit in either polarity; and means for synchronizing the operation of the switching means so that the DC power source is applied to the load circuit with alternating polarity at the frequency of the AC power source;

wherein the synchronizing means includes a logic circuit having:

comparator means to generate a first signal train of control pulses wherein a control pulse is generated during each positive half cycle of the AC power source for substantially the duration of the positive half cycle;

a pulse shaper circuit means to generate a second signal train of pulses wherein the pulses thereof substantially temporally occur at the zero crossings of the AC power source;

a delay circuit means that receives the first and second signals and produces a third signal train of pulses, each of the latter pulses commencing a predetermined time delay after the occurrence of a zero crossing and terminating a predetermined time after its commencement; and logic means to form control signals from the first and third signals wherein the control signals regulate the operation of the switching means so that the DC power source is applied to the load circuit during each half cycle of the AC power source for a predetermined time which is less than the duration of the half cycle.

9. The DC-AC converter of claim 8 wherein the synchronizing means also includes drive circuit means operatively connected between the logic circuit and the switching means, for driving the switching means in accordance with the control signals generated by the logic circuit.

* * * * *